Oct. 15, 1957  F. D. HAUPTMAN  2,809,393
APPARATUS FOR MAKING PLASTIC HOSE
Filed June 23, 1955
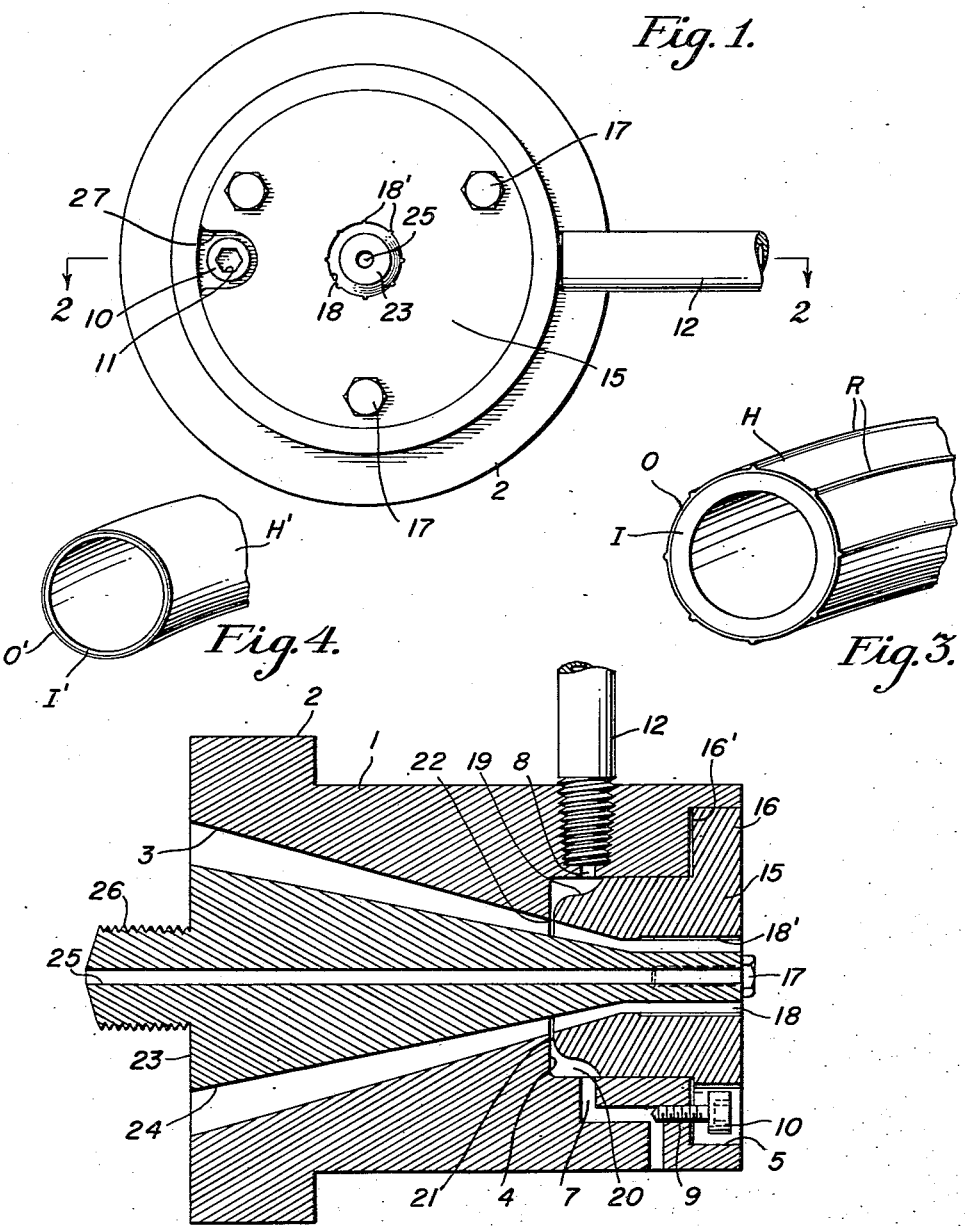
INVENTOR
FERDINAND D. HAUPTMAN
BY
ATTORNEY

United States Patent Office 2,809,393
Patented Oct. 15, 1957

2,809,393

APPARATUS FOR MAKING PLASTIC HOSE

Ferdinand D. Hauptman, Philadelphia, Pa., assignor to H. K. Porter Company (Delaware), a corporation of Delaware Application June 23, 1955, Serial No. 517,467

3 Claims. (Cl. 18—13)

The present invention relates to the manufacture of plastic hose, particularly of the type known as garden hose, made from thermo-plastic synthetic polyvinyl compounds hightly resistant to abrasion at ordinary temperatures and capable of forming light yet tough and elastic hose suitable for use in conveying water under pressures within the range common in domestic systems.

Materials for the manufacture of hose of this character are generally available on the open market but, particularly in garden hose, outer appearance is of considerable commercial importance and polyvinyl plastic materials with precise color uniformity are extremely difficult to procure except at considerably greater cost than when color is not a factor.

It has been suggested that to reduce the proportion of uniformly colored material required polyvinyl plastic hose might be manufactured with the aid of apparatus such as disclosed in U. S. Letters Patent 2,574,555, granted November 13, 1951, to Frederick M. Galloway, for Apparatus for and Method of Making Multiple Ply Extruded Hose, comprising an extruding head having a double orifice adapted for extrusion of concentric integrated tubes of rubber of different specific properties. This apparatus has been found very effective in the manufacture of rubber hose but it cannot be used satisfactorily to make hose from thermo-plastic polyvinyl and similar compounds for reasons which are not fully understood but which result in the production of hose having streaked and nonuniform outer appearance which for this and other reasons is not acceptable to the trade.

It is therefore a principal object of the present invention to provide an improved extruding head adapted for production of hose from polyvinyl plastic materials and the like in which an inner layer of the hose may be of one or a plurality of colors with a relatively thin but longitudinally and circumferentially substantially uniform outer layer of a similar plastic of a predetermined and uniform color integral with it providing a pleasing outer appearance and coloring with minimum utilization of outer covering material.

It is a further object to provide a hose extruding head of convenient dimensions whereby within limits the inner and outer diameters of "two-ply" hose produced therewith as well as the thickness of each of the layers of material comprising it may be controlled and adjusted to suit the desires of the operator and/or the trade.

Other objects, purposes and advantages of the invention will hereinafter more fully appear or will be understood from the following description of a preferred embodiment of it in which reference will be had to the accompanying drawing showing in:

Fig. 1 a front elevation of the extruding head of my invention adapted for the production of two-ply plastic hose; in Fig. 2 a horizontal axial section on the line 2—2 in Fig. 1; in Fig. 3 an exaggerated end view of a piece of one grade or type of hose produced by the head, and in Fig. 4 a similar view of a piece of hose of another grade or type.

Referring now more particularly to the drawing it will be appreciated that the head illustrated therein is designed for operation in connection with extruding apparatus generally of the class of that with which the head disclosed in the said Patent 2,574,555 is used and thus comprising independently operated plastic material feeding screws or other pressure generating devices whereby the stock may be fed into the head under pressure at suitably controlled temperatures and feeding rates. Since such machines are now in general use in the industry it is not necessary to illustrate a typical one although the head is hereinafter described with reference thereto and as if actually disposed in proper operative relation therewith.

More particularly the head comprises a generally cylindrical main outer body 1 having at one end an integral radial collar or flange 2 adapted for engagement by a retaining ring or other suitable parts for holding it in assembled relation with one of the extruding machines (not shown). Concentric with the said flange the body is provided with a frustoconical passage 3 converging toward the opposite end of the body and terminating at the inner end of an enlarged coaxial generally cylindrical chamber 4, the opposite end of which opens into an outer concentric annular recess 5 in which is received a cooperating part of the head hereafter more fully described.

Leading from the chamber 4 adjacent the preferably coved juncture between its bottom and its cylindrical side wall are diametrically opposed ducts 7 and 8, the former of which extends radially outward a short distance, thence parallel with the head axis a somewhat greater distance and thence again radially to the outer surface of the body, the portion thereof parallel to said axis having an extension 9 internally threaded for the reception of a threaded needle valve 10 desirably having a wrench-receiving hexagon socket 11 to enable the valve to be adjusted to control the effective area of the duct 7. On the side of the head opposite duct 7 the duct 8 is connected with a feed pipe 12 through which, from an appropriate source such as another extruding machine (not shown) heated cover stock is delivered under pressure.

The cooperative die member 15 of the head is likewise generally cylindrical in external contour and comprises a radial flange 16 adapted for reception in the annular recess 5 at the end of the body; when assembled with the latter its inner extremity lies in a plane normal to the head axis and is spaced from the bottom wall of the body chamber 4 a short distance which may be controlled by adjustment of retaining screws 17 engaging the outer face of the flange 16 and seated in suitably threaded holes in the body at points circumferentially uniformly spaced about its axis. Internally the die member is tapered in substantial prolongation of the frustoconical passage 3 in the body to a cylindrical passage 18 extending to the outer extremity of the die member and provided if desired with a plurality of circumferentially spaced longitudinal narrow and shallow grooves 18' which are somewhat exaggerated in width and depth as shown to facilitate their illustration; the external portion 19 of the inner end of the die member is formed substantially to the contour of a cyma curve in radial section for cooperation with the bottom of the cylindrical chamber 4 of the body to provide an annular passage 20 for the reception of plastic material introduced through the pipe 12, the narrow plane annular surface 21 at the end of the curve being spaced from the bottom of the chamber 4 a distance controlled by the adjustment of the screws 17 and forming with said bottom a radially inwardly directed annular orifice 22. A small clearance 16' is normally maintained by screws 17 between flange 16 and the bottom of the recess 5 in which it is received to permit adjustment of the axial width of said orifice. In the interior of the head within passages 8 and 18 a mandrel 23 is positioned coaxially with the casing and die member and provided with a tapered outer surface 24 frustoconical in shape in general conformity with the frustoconical inner surfaces of the body and die member and converging slightly therewith toward its minimum diameter and thence extending substantially cylindrically through passage 13 to the outer end of the die member, the mandrel having a small axial air passage 25 extending throughout its length for a purpose which will hereinafter appear. A threaded boss 26 on the inner end of the mandrel affords means for securing it to the adjacent feeding apparatus (not shown) by which the stock for the inner layer or body of the hose is forced into passage 3.

It will be noted from the drawing that flange 16 of the die member 15 is recessed at 27 in registry with the head of needle valve 10 controlling duct 7 in the body to permit adjustment of said valve without disturbing the adjustment of the die member.

Considering now the operation of the head in the manufacture of two-ply plastic garden hose it will be assumed the head is assembled with an extruding machine to receive in the frustoconical passage 3 formed between the body and the mandrel a substantially continuous supply of heated thermoplastic stock under sufficient pressure to force the same through the passage and to cause it to be extruded from the annular orifice formed at the outer end of the head by the corresponding ends of mandrel 23 and die member 15; material to form the outer covering of the hose is delivered in like manner to the pipe 12 and forced therethrough into the annular passage 20 surrounding the inner end of the die member at suitable temperature and pressure correlated with the temperature and pressure of the material fed to passage 3 so as to cause the cover material to be extruded through the flat annular orifice 22 into substantially fusing relation with the material moving through said passage (3) and destined to become the inner layer of the extruded hose. The duct 7 controlled by the needle valve 10 permits flow of a small amount of the cover stock from the head to maintain circulation and insure substantially uniform pressure of said stock circumferentially of the annular passage 20 and orifice 22 through which the major part of it is extruded into contact with the stock for the inner layer, grooves 18' when they are provided forming ridges on the outer surface of the hose from some of the former.

After the initial extrusion of the hose from the head its end is closed by a clamp or otherwise to prevent escape through it of air supplied by way of air passage 25 in the interior of the mandrel connected with a suitable source (not shown); the air at positive controlled pressure thus discharged into the interior of the hose as the latter progressively emerges from the head prevents collapse of the hose while the material of which it is made is cooling and solidifying, a water spray (not shown) usually being directed against it to facilitate its cooling as it leaves the head.

By appropriate control of the said air pressure and of the temperature and feeding rates of the two separate plastic supplies introduced into the head as above described, as well as by adjustment of the position of the die member 15 with relation to the body to control the width of the annular orifice 22 and the rate of withdrawal of the extruded product plastic hose of any selected diameter and wall thickness within limits may be made and both the total and the relative thickness of the inner and outer layers controlled as well.

Thus the adjustments of the various control elements determine the physical dimensions of the tubular articles produced, and while the drawing indicates that the annular orifice 22 may have appreciable width, measured axially, the clearance 16' is desirably just sufficient to permit the die member 15 to be substantially fully seated in the chamber 4 with the inner end face 21 of the former virtually in metal to metal contact with the adjacent plane bottom surface of the chamber; even when the orifice is thus almost fully closed, however, thermo-plastic material supplied hot and in fluid or semi-fluid condition under pressure from pipe 12 readily finds its way through the orifice in sufficient quantity to provide an outer layer of appreciable thickness on the finished hose, the stock forming the inner body making a sort of wiping contact with the outer layer stock at the annular mouth of the orifice where the two merge together. Although both stock materials are in fluid or semi-fluid condition at the moment of merging and for a measurable time thereafter as they issue together from the head and before cooling there is little or no evidence in the finished hose of diffusion between them as between ordinary miscible liquids when brought into contact with each other since even under high magnification there appears a distinct and sharp border line of no perceptible thickness between the zones of contrasting color in the inner core and outer layer; the mutual physical bond between them is, however, complete and uniform both longitudinally and circumferentially and it is normally impossible to remove the outer layer from the hose without damaging the core.

In practice it is usually advisable to provide in addition to the water spray above mentioned an elongated trough containing a cooling medium adjacent the head and to pass the hose therethrough to cool it as quickly as possible from working temperature, usually in the neighborhood of 360° F., to room temperature or below; after cooling it may be cut to suitable lengths and equipped with end fittings in the usual way prior to its use or sale.

As above indicated a particular advantage in the manufacture of plastic hose by means of this head is realized when an outer layer of material distinctively colored and of different color from the material economically available for making the main inner layer of the hose is desired. Thus polyvinyl plastic materials in pieces of variant sizes and colors are often available at relatively low cost and these readily can be granulated and the granules usually commingled before being heated and fed into passage 3 of the head. The outer layer, made of similar granulated material but of controlled preferably uniform color, may be of thickness of the order of .002" when the inner layer is approximately $3/32$" thick in hose nominally $7/16$" I. D. by $5/8$" O. D., thus maintaining the ratio between the consumption of the material for the outer and inner layers in the neighborhood of 12:1.

Thin walled plastic tubing of the kind now becoming popular for portable lawn sprinkling systems when provided with minute longitudinally spaced slits or perforations can also readily be produced with the aid of this extrusion head; for example, by suitably controlling the temperatures and feeding rates of the plastic supplies, the axial thickness of the annular orifice 22 by adjustment of screws 17 and the internal air pressure in and the withdrawal rate of the product $1/2$" I. D. tubing may be made with total wall thickness about .030" comprising an outer layer only about .001" thick.

It thus is evident that when there are available only limited quantities of the material desired for the outer layer but relatively unlimited quantities of similar material of non-uniform or undesirable color it is practical to produce substantially twelve to thirty or more times as much hose all of uniform surface coloration as could be made from the same amount of the controlled color material alone. As the cost of thermo-plastic materials of the polyvinyl type when specified as to color is presently about two and a half times as much as when color is of no materiality it consequently is apparent that hose made with the aid of my improved head may enjoy a substantial competitive advantage over that made of a single layer of chemically comparable material having the outer appearance demanded in the trade.

Moreover by appropriate control and adjustment of the character mentioned and without modifying the structure of the head itself production of different sizes of hose from 1/16" I. D. to 2" I. D. is within the capacity of the head and still larger sizes can be made with a head having greater dimensions and correspondingly increased capacity in its feeding and other auxiliary components, the dimensions herein mentioned being based on utilizing a head in which the diameter of passage 18 is approximately 3/4" and that of the cylindrical outer extension of mandrel 23 approximately 1/2".

It will be apparent that particularly in thin-walled tubing where the thickness of the outer coating is of the order 1/30 of the total wall thickness, the additional cost of distinctively colored outer layer material as compared with that of the indiscriminately colored material which can be used for the main body of the tubing is a relatively negligible factor as compared with making the tubing entirely of such distinctively colored material, yet tests have indicated that with the outer layer only .001" thick the tubing retains the pleasing appearance imparted thereby throughout its useful life under ordinary service conditions, no appreciable cracking, chipping, checking, abrasion or other impairment of the surface having been found after accelerated tests simulating such service.

It is a property of polyvinyl plastics of the character of those preferably utilized in the manufacture of hose in accordance with this invention that reworking at appropriate temperatures a reasonable number of times does not appreciably impair their physical characteristics. Taking advantage of this property my extruding head permits the manufacture of the inner layer of hose from polyvinyl plastic articles disposed of as scrap by the makers thereof for departures from specifications or other reasons not related to the fundamental physical or chemical characteristics of the materials themselves. Thus such articles which during or after manufacture become unfit for their intended purposes due to physical damage, undesirable colorations or discolorations and the like may be granulated with the aid of suitable apparatus and granules of many different colors intermingled to provide feeding stock for making the inner layer of my hose without regard to their color, the material for the outer layer being supplied from a relatively more limited source since fairly exact uniformity in color and appearance are here comparatively major considerations.

In Fig. 3 I have diagrammatically illustrated with some exaggeration a piece of hose H made by my extrusion head, comprising an inner layer I, which in an actual garden hose may be about 7/64" thick and an outer layer .002" thick except at the ridges R formed by grooves 18' where the outer layer may be about twice this thickness in hose the nominal internal diameter of which is 7/16". It is of course impractical and in fact unnecessary to attempt to illustrate the variegated and commercially undesirable coloration of the inner layer I or the acceptable coloration of the outer layer O normally present in the hose but it will be understood the color of the inner layer is of no importance, as its uniformity or conformity to any standard is not a factor in determining commercial acceptability of garden hose and the like provided a relatively indestructible uniform outer surface of acceptable coloration is provided, as in hose made in accordance with the invention. Thus blue, red, gray or any other color may predominate in the inner layer and be streaked and non-uniform both longitudinally and circumferentially of the hose depending on the stock used and provided a uniform stock of controlled color, say grass green, be supplied for the outer layer acceptable hose is thereby produced at a cost for materials considerably less than in comparable hose as heretofore made, while utilizing as the principal raw material so far as volume is concerned, scrap or the like which might otherwise have to be discarded as wholly useless and of little, if any, commercial value.

Generally similar considerations apply to the manufacture from such thermo-plastic materials of other kinds of tubular articles of the general nature of those just discussed and there is illustrated in Fig. 4 in the exaggerated manner of Fig. 3 a small piece of thin walled tubing made with a head substantially the same as that used for manufacture of the hose of the latter figure but with the grooves 18' omitted to impart to the tubing H' a smooth rather than a ridged outer surface. In this tubing when about 1/2" I. D., as has been mentioned, the wall may have a total thickness of 0.030" or thereabouts comprising an inner layer I' about 0.029" thick predominantly made from reworked scrap material and an outer layer O' of distinctively and uniformly colored material therewith and about 0.001" thick, the tubing having the same physical and chemical properties and characteristics as dimensionally similar tubing made entirely from a single homogeneous stock of one color or of a number of colors indiscriminately blended together.

It will be understood, however, that the relative cost of the materials which may be employed in the manufacture of hose in accordance with the invention is not necessarily a controlling factor and it is not essential that the inner and outer layers of the hose be made of chemically similar compositions differing only in the coloring materials they contain provided they are sufficiently compatible to become permanently bonded together during extrusion. Thus, if desired, the inner layer may be made, for example, of a plastic material having desirable properties as to flexibility, strength and the like but susceptible to rapid deterioration on contact with foreign substances or influences such as organic solvents or sunlight. In instances of that nature the outer layer may be made of a material which may be not ideally adapted for hose when it alone is used but sufficiently resistant to such substances or influences as to afford adequate protection to the inner layer and thus enable the material forming the latter to be used successfully as the volumetric major ingredient of the hose despite its inadequacy in respect to those certain properties which it lacks. On the other hand in some instances it may be desirable to make the inner layer of a material not especially suited to hose manufacture but having desirable properties in respect to the fluid to be conveyed through it. In such instances the outer layer stock may supply other characteristics in which that forming the inner layer is deficient to produce composite hose suitable for use for special purposes in industry.

Consequently, while I have herein described one embodiment of the invention with considerable particularity in relation to the manufacture of garden hose and tubing it will be understood I do not desire or intend to be limited or confined thereto or thereby in any way as changes and modifications in the compositions employed, the conditions under which they are utilized and in the form, structure, relationship and operation of the several mechanical elements combined in my novel extruding head will readily occur to those skilled in the art and may be made if desired without departing from the spirit and scope of the invention as defined in the appended claims.

Having thus described my invention, I claim and desire to protect by Letters Patent of the United States:

1. An extrusion head for production of multiple layer thermo-plastic hose comprising a body providing at one end an inwardly extending chamber having its bottom normal to the chamber axis and a frustoconical passage diverging outwardly from said bottom toward the other end of the body coaxially with the chamber, a die member entered in the chamber to and terminating in a plane parallel with but spaced from said bottom to define with the latter proximate the end of said frustoconical passage a radially outwardly extending annular orifice, the die member having a frustoconical passage converging from the inner end of the member in prolongation of the frustoconical passage in the body and terminating in a cylindrical extrusion passage extending to the outer end of the member, and a mandrel projecting through but spaced from the walls of all said passages and having a frustoconical portion of less taper than the frustoconical passages and a cylindrical portion conforming to the cylindrical passage, the body including a duct for the feeding of plastic material into said orifice.

2. An extrusion head as defined in claim 1 in which the inner corner of the die member is relieved away from its extremity to form with the chamber wall an annular passage communicating with said orifice and with said duct for reception of the plastic material preparatory to its entry into the orifice.

3. An extrusion head as defined in claim 1 in which said extrusion passage in the die member has a plurality of circumferentially spaced grooves in its wall extending from points spaced from the end thereof adjacent said frustoconical passage to the opposite end of the extrusion passage.

References Cited in the file of this patent

UNITED STATES PATENTS

| | | |
|---|---|---|
| 2,105,812 | Gordon et al. | Jan. 18, 1938 |
| 2,121,966 | Jacobson | June 28, 1938 |
| 2,461,594 | Flounders | Feb. 15, 1949 |
| 2,461,630 | Cozzo | Feb. 15, 1949 |
| 2,519,375 | Jargstorff et al. | Aug. 22, 1950 |
| 2,528,200 | Weinberg | Oct. 31, 1950 |
| 2,574,555 | Galloway | Nov. 13, 1951 |
| 2,616,126 | Merck et al. | Nov. 4, 1952 |
| 2,683,897 | Patterson | July 20, 1954 |
| 2,690,769 | Brown | Oct. 5, 1954 |
| 2,742,669 | Rhodes | Apr. 24, 1956 |

FOREIGN PATENTS

| | | |
|---|---|---|
| 423,496 | Great Britain | Feb. 1, 1935 |